Oct. 13, 1953     C. B. STEVENS     2,654,895
SLEEPING CAR SECTION
Filed Aug. 11, 1948     6 Sheets-Sheet 1
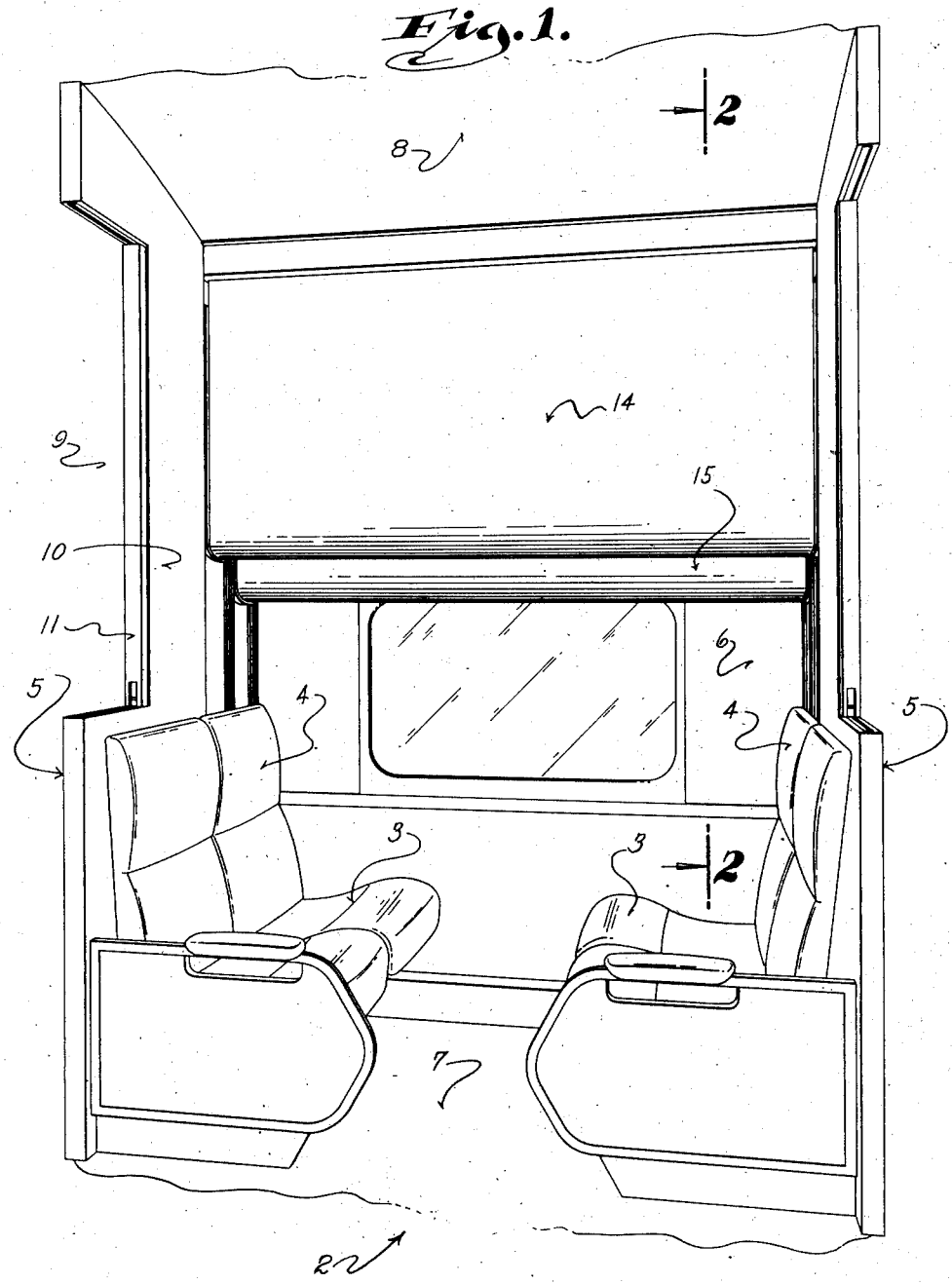

Oct. 13, 1953  C. B. STEVENS  2,654,895
SLEEPING CAR SECTION
Filed Aug. 11, 1948  6 Sheets-Sheet 2
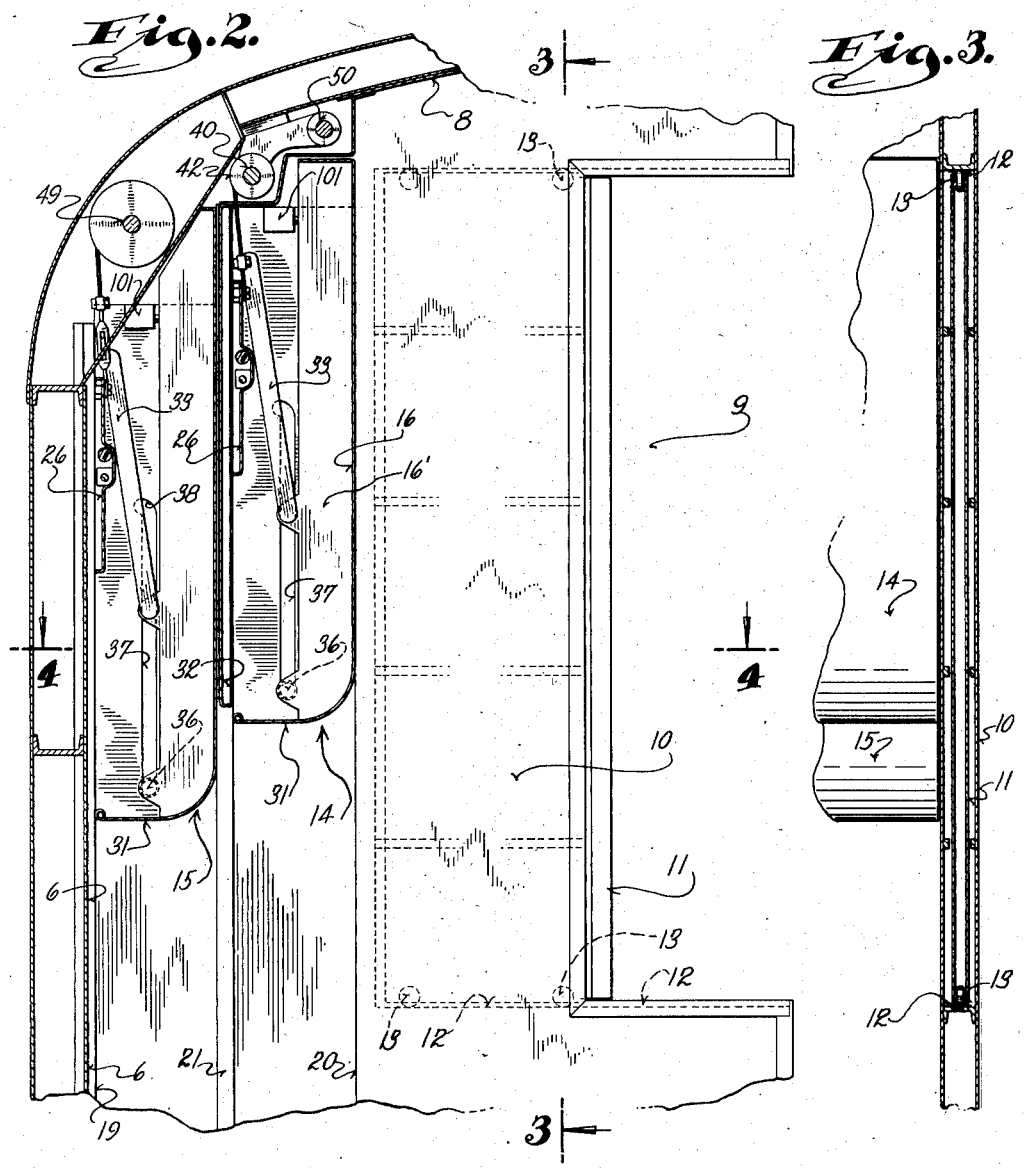
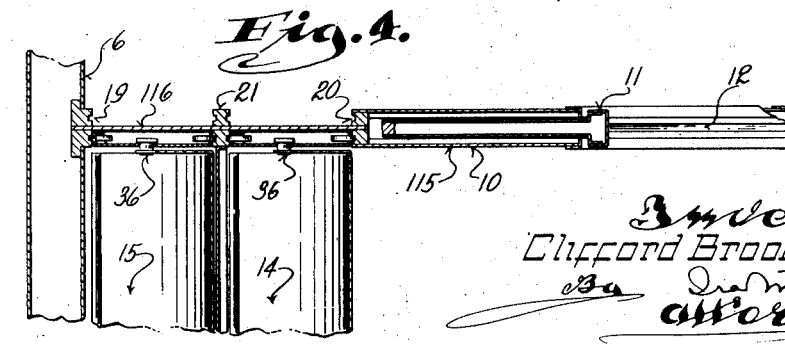
Inventor
Clifford Brooks Stevens

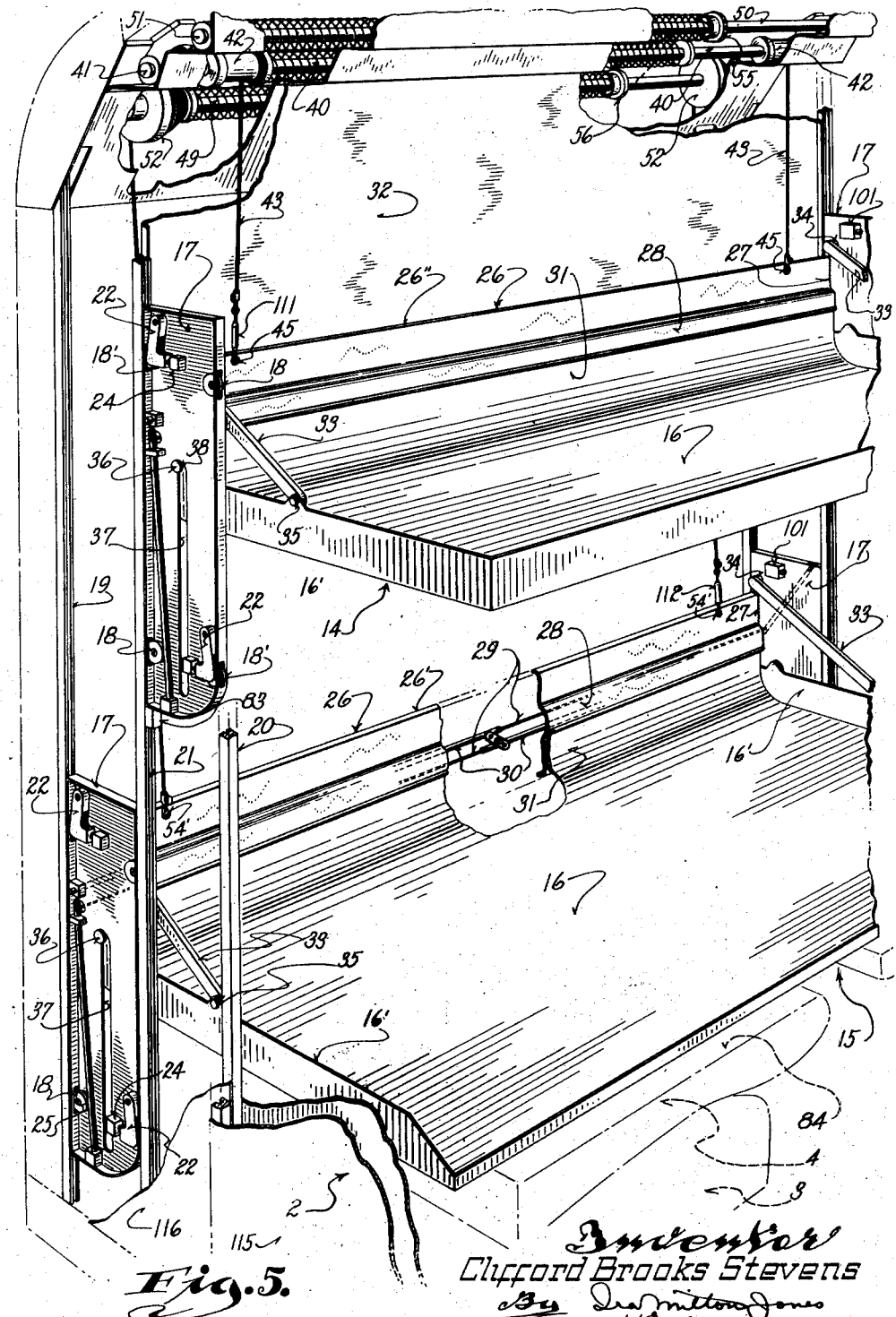

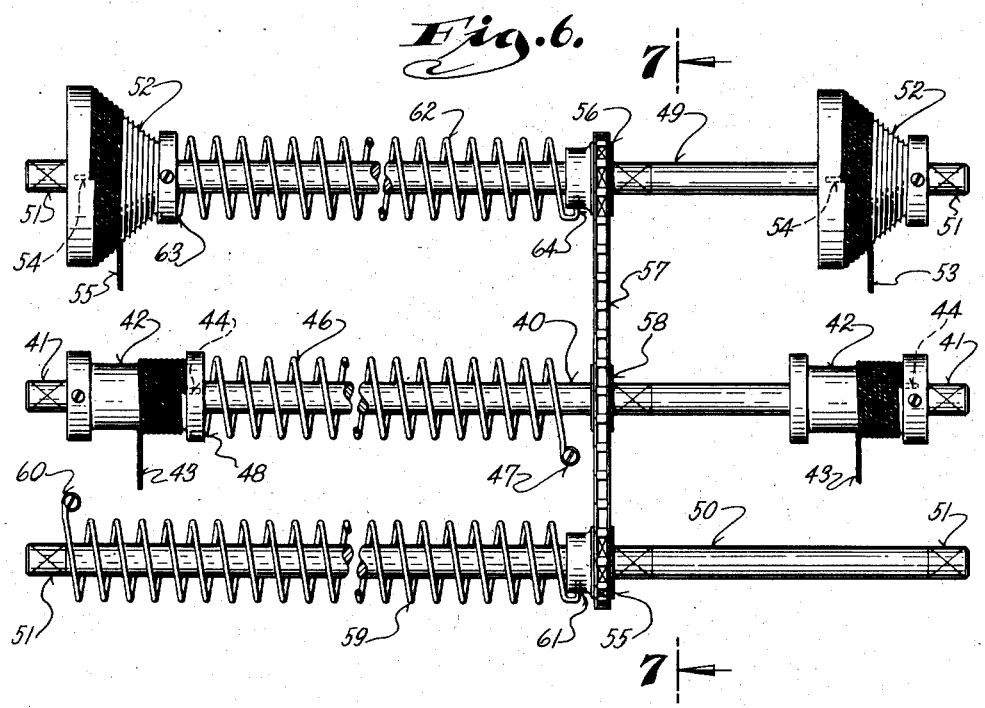
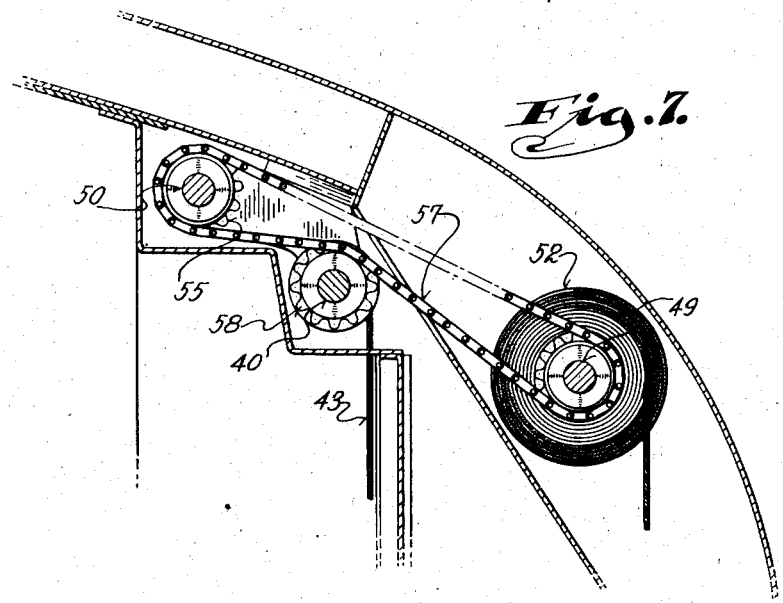

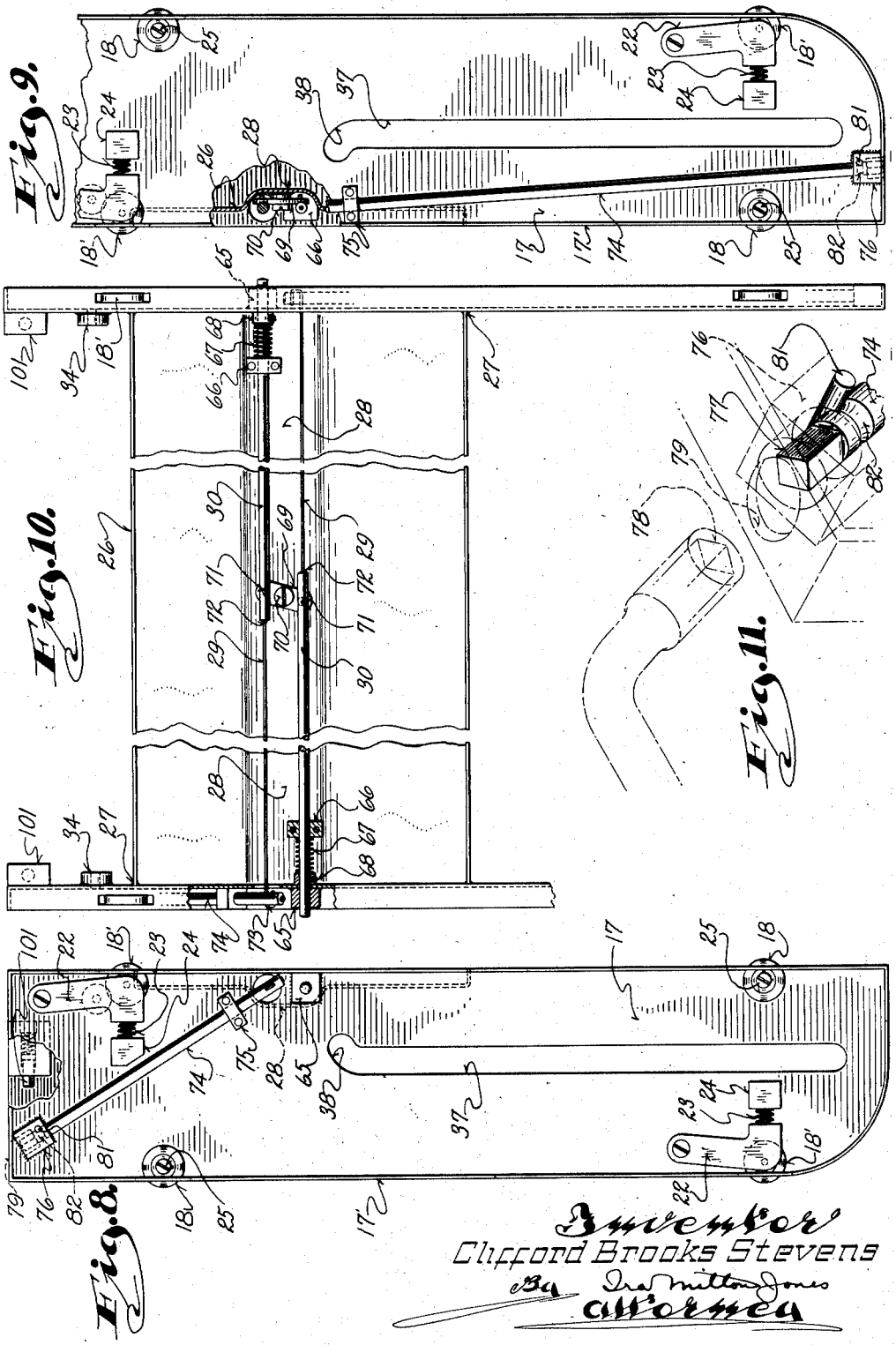

Oct. 13, 1953

C. B. STEVENS 2,654,895

SLEEPING CAR SECTION

Filed Aug. 11, 1948

Inventor
Clifford Brooks Stevens
By Ira Milton Jones
Attorney

Patented Oct. 13, 1953

2,654,895

UNITED STATES PATENT OFFICE

2,654,895

SLEEPING CAR SECTION

Clifford Brooks Stevens, Fox Point, Wis., assignor to Arnot Sleeper Corporation, Baltimore, Md.

Application August 11, 1948, Serial No. 43,641

7 Claims. (Cl. 5—9)

This invention relates to improvements in folding berths or bunks of the type used in railroad sleeping cars and refers more particularly to a double deck berth or bunk especially adapted for use in a convertible sleeping car section of the type providing seating accommodations for daytime travel and a pair of beds, one above the other, at night.

In the sleeping car berths of this type which have heretofore been in common use the lower berth is formed from the two seats of the section, and it is therefore necessary to store lower berth mattresses, pillows and bed clothes in the upper berth during the day. Hence at any one time the section must either be devoted entirely to seating or to sleeping, since normal seating is impossible when the seats are in the position in which they form the lower berth, and the upper berth is normally unavailable for daytime naps because it is filled with the paraphernalia required for the lower berth. Moreover, because of the necessity for completely making up both berths at the time of changeover from seating to sleeping accommodations, such "make-down" required about four and one-half hours for the standard fourteen-section sleeping car.

The most annoying result of these disadvantages in former sleeping car accommodations was that some passengers in each car were virtually compelled to go to bed almost immediately after supper while others, whose berths were made-down last, could not go to bed until almost midnight.

By contrast, it is an object of this invention to provide a sleeping car section of the character described having conventional four-passenger seating accommodations for daytime travel and having upper and lower berths which may be made up before being folded away so that such berths are immediately available as sleeping accommodations when they are unfolded from their daytime positions.

Another and very important object of this invention resides in the provision of a sleeping car section of the character described having upper and lower pre-made berths either of which may be lowered into its operative or sleeping position without the necessity for disturbing the other. In this manner, the upper berth may be used alone for daytime naps without interfering with normal seating accommodations in the section or entailing complicated re-arrangement of storage space for bed clothes and the like; or only the lower berth may be used without disturbing or unfolding the upper berth, so that the lower berth occupant may have more space and headroom when the upper berth is not occupied.

Another object of this invention is the provision of a double deck sleeping car section of the character described which will provide a materially shorter "make-down" time for the porter.

Another object of this invention resides in the provision of a double deck sleeping car section of the character described which will afford a generous amount of storage space under the seats.

In addition to achieving these objectives, the sleeping car section of this invention affords certain additional advantages. More comfortable berths of increased width and length may be provided without reducing the usual number of sections per car (14 in all) and without decreasing the head room or normally usable space in the car. Moreover, with the berth of this invention a large portion of each of the bulkheads or partitions between sleeping car sections may be cut away, thereby affording a more open and convivial atmosphere in the car as contrasted with the closed-in appearance of a sleeping car provided with berths of the older type.

It is also possible, with the berth of this invention, to provide push button control of the berths so that individual travelers may operate the berth to the position which suits their convenience, or alternatively it may be provided with control means which can be actuated only by means of a key in possession of the porter.

While the berth of this invention has been here discussed with respect to its application to a railroad sleeping car section it will readily be seen that it may also be used to advantage in sleeping car compartments and in other vehicles such as house trailers and marine and aircraft installations.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 1 is a perspective view of a sleeping car section showing the two pre-made berths of this invention in inoperative or daytime position;

Figure 2 is a sectional view taken along the plane of the line 2—2 in Figure 1;

Figure 3 is a sectional view taken along the plane of the line 3—3 in Figure 2;

Figure 4 is a sectional view taken along the plane of the line 4—4 in Figure 2;

Figure 5 is a perspective view of the berths of this invention in their position of use, portions being cut away to show detail;

Figure 6 is a somewhat diagrammatic top elevational view of the spring and pulley mechanism for the berths of this invention;

Figure 7 is a sectional view of the spring and pulley mechanism of the berths of this invention taken along the plane of the line 7—7 in Figure 6;

Figures 8 and 9 are, respectively, right and left end elevational views of the carriage for one of the berths of this invention, portions being cut away to show detail;

Figure 10 is a side elevational view of the carriage for a berth of this invention, looking from the rear thereof, portions being cut away to show detail;

Figure 11 is a perspective view of a detail of the lock actuating mechanism.

Figure 12:
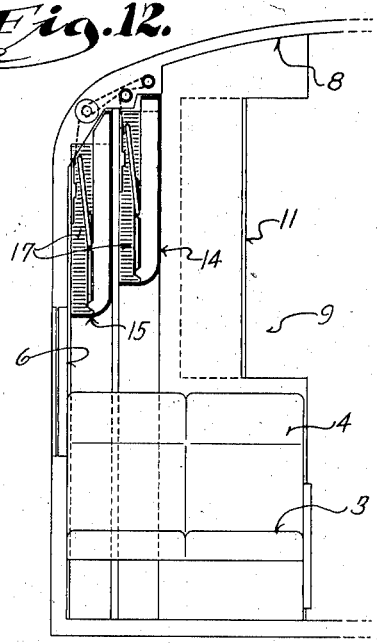
Figures 12 to 15 inclusive are diagrammatic sectional views, looking endwise, of a sleeping car section embodying berths of this invention and showing such section in four different arrangements of seating and/or sleeping accommodations.

Referring now more particularly to the accompanying drawings, in which like numerals designate like parts throughout the several views, the numeral 2 designates generally a sleeping car section having the conventional two shelf-like cushioned seats 3, each capable of accommodating two passengers, the space beneath the seats being available for storage of luggage. Each seat has a folding back 4 which is backed by a vertical bulkhead or partition 5, the two bulkheads which define each section being parallel to one another and spaced apart a distance substantially equal to the length of a berth.

Each bulkhead extends from the aisle of the car to its side wall 6, and vertically from the car floor 7 to its ceiling 8 and has a cutout portion 9 on its aisle side extending from just above the top of the seat back 4 to a point just below the ceiling 8 of the car. This cutout may be as wide as desired, up to a width equal to substantially half the width of the seat, to provide an atmosphere of openness and conviviality, or may be omitted entirely if it is desired to create an atmosphere of semi-privacy throughout the car.

If a cutout 9 is provided, the portion 10 of the bulkhead inwardly thereof is made with a double wall to receive a sliding panel 11, and is provided with horizontal tracks or runners 12 adapted to cooperate with rollers 13 or similar antifriction means on the panel to guide the same into or out of retracted position. It will of course be understood that the panel may be extended during the day to afford greater privacy to the occupants of the section and that at night, it is extended fully to bring its outer edge flush with that of the bulkhead, thus affording complete privacy between adjacent sections.

The berths, when inoperative, are swung to a vertical position and located directly under the ceiling 8 of the car, with the upper berth 14 directly alongside the lower berth 15, while the latter lies immediately adjacent to the side wall 6 of the car. Each of the berths comprises a pan-like bed member 16 having an upwardly turned rim 16' around its ends and outer edge and a somewhat higher rim or lip 31 at its rear edge which prevents bedclothes from falling out of the berth when the same is tilted to its vertical inoperative position. Each berth is pivotally mounted at its ends to a carriage by means of which the berth, when folded, is carried vertically up to its inoperative location or down to its operative location.

The carriage for each bed member comprises a pair of substantially rectangular end plates 17, joined by a channel 26. Each of the end plates 17 is a flat plate having an outwardly turned rim or flange 17' around it and its outline conforms substantially to the cross section of the bed member. Each end plate is also provided with two pairs of rollers 18 and 18' which track in spaced apart vertical rails 19, 20 and 21 secured to each of the bulkheads 5 to enable vertical movement of the berth. The rails 19 are adjacent to the side of the car, and are substantially U-shaped channels, as are the outermost rails 20. The flanges of the rails 19 and 20 extend toward one another, while the central rail 21 has an H cross section, the flanges extending in opposite directions, toward the rails 19 and 20, so as to cooperate with them in providing a pair of tracks for the end plates of each berth.

Two of the rollers 18', one at the top of one side of each end plate and one at the bottom of the other side thereof, are rotatably mounted on pivoted arms 22, and a compression spring 23 reacting between each arm and a lug 24 fixed to the end plate urges the rollers 18' outwardly into positive engagement with the rails to preclude the end plate from rattling against the rails. The rollers 18 at the other two opposite corners of the end plate may, of course, be rotatably journalled on pintles 25 suitably fastened to the end plate.

The channel 26 which connects each pair of end plates and holds them aligned with one another has each of its ends joined to the inner surface of the adjacent end plate in any suitable manner, such as by welding 27. The channel 26 has an outwardly bowed ridge 28 extending along its longitudinal center to provide clearance for lock cables 29 and rods 30, the function of which will be described later.

The lip 31 on the rear edge of the bed member 16 abuts the ridge 28 when the bed is in its horizontal position of use; and since the channel 26' for the lower berth 15 is flatwise adjacent to the car wall 6, while the channel 26" for the upper berth 14 is flatwise adjacent to a false wall 32 extending down from the ceiling of the car and spaced inwardly of the car wall 6 and parallel thereto, there is no slot or opening between the inner edge of either berth and its neighboring wall through which small articles might be dropped. The false wall 32 extends downwardly far enough so that the rear rim or lip 31 of the upper berth will substantially meet it when the berth is in its inoperative position (see Fig. 2), and the rim or lip 31 of the lower berth similarly engages the car wall 6. Thus, when a berth is folded, its lip 31, in cooperation with the wall which it abuts, prevents bedclothes from falling downwardly out of it.

It should also be noted at this point that the front (or aisle) portion 115 of each bulkhead 5 has a double wall to receive the sliding panel 11, while the rear portion 116 is a single thickness of material (see Fig. 4). Consequently the rails 19, 20 and 21, and the end plates 17, all of which closely adjoin the surface of the rear bulkhead portion 116, all have their surfaces flush with the surface of the front portion 115 of the bulkhead, and when the bed member 16 is swung down into its position of use it will be seen that its upturned end edges 16' lie closely adjacent to the front bulkhead wall portion 115.

Each bed member 16 is principally supported from its associated end plates 17 by means of a pair of links 33. Each link is pivotally secured at its upper end to its end plate, near the top rear thereof as at 34, and is pivotally connected at its lower end to an upturned end edge 16' of the bed member 16, at a point intermediate the longitudinal centerline of the bed member and its rear edge, as at 35. The respective pivotal connections of each pair of links are, of course, coaxial.

To guide the bed member in swinging between its operative and inoperative positions it carries a pair of studs 36 each secured at an end of the bed member at a point near its rear edge and projecting endwise into a vertical slot 37 in the adjacent end plate. The upper end of the slot is disposed at a slight rearward angle to the rest of the slot, as at 38, so that when the bed member is in its horizontal position of use the body thereof must be moved slightly forwardly to enable it to be swung to its vertical inoperative position, in which the stud 36 is at the bottom of the slot.

It will readily be seen that when an occupant of the berth is lying forwardly of the axis about which the links 33 are pivoted to the bed member, his weight tends to pivot the bed member about said axis, and such pivotal motion is resisted by the cooperation of the stud 36 with the top of the slot 38. On the other hand, if the occupant's weight is imposed upon the bed member rearwardly of said axis, the angular disposition of the links 33 is such that a portion of the weight is resolved into a rearwardly directed component which, because of the cooperation of the stud 36 with the angled upper end of the slot 38, precludes tilting of the bed member. When the bed member is tilted to its vertical inoperative position (see Fig. 2) it will be seen that it will be held in that position by its own weight acting to keep the links 33 swung downwardly, together with the situation of the studs 36 at the bottoms of the slots 37. Thus the bed member is securely but readily releasably retained in either its horizontal operative or vertical inoperative position by the structural arrangement just described, without any need for additional locking means.

Since the bed member virtually falls into its vertical inoperative position, a suitable bumper 101 is secured to the inner surface of each end plate, in a position to be engaged by the upturned end edge 16' of the bed member, to preclude slamming of the bed member when it is moved into inoperative position and to prevent rattling thereof when in said position. The bumper is illustrated as a spring and plunger mechanism, but it will be obvious that a rubber pad or other suitable type of shock absorber could be used equally well.

To facilitate bodily raising and lowering of the two berths from their operative locations to inoperative locations stowed out of the way against the ceiling of the car, a portion of the weight of each berth is counterbalanced by means of arrangements of torsion springs and cables (see Figs. 6 and 7) now about to be described.

For the upper berth 14 a shaft 40 is rotatably journalled at each of its ends in bearings 41 fixed with respect to the car structure, near the junctures of the bulkheads with the ceiling 8 of the car. This shaft extends substantially the entire length of the bed members and is parallel to their longitudinal center lines. A drum 42 is fixed at each end of the shaft to rotate therewith, and a pair of cables 43 are each secured at one end to a drum, as at 44, and at the other end to the channel 26'' joining the carriage members which support the upper berth, as at 45, at a point directly under the drum. A turnbuckle 111 on one of the cables, near its point of attachment to the channel 26'', enables tension of the two cables to be equalized. A torsion spring 46 is wound around the shaft 40 and has one of its ends secured to the fixed car structure, as at 47, while its other end is secured to the shaft, as at 48.

It will be seen that as the upper berth is drawn downwardly toward its operative location the cables 43 are unwound from the drums 42 and the spring 46 is wound up in consequence to rotation of the shaft 40, thus resisting a substantial portion of the weight of the berth to prevent it from dropping violently as it is lowered. The spring 46, of course, again unwinds as the berth is raised, winding the cables 43 onto the drums 42 and thus carrying a substantial proportion of the weight of the berth as it is raised to its upper inoperative location.

Since the lower berth travels through a greater vertical distance but weighs substantially the same as the upper berth a slightly different arrangement is provided for it. A main shaft 49 and a secondary shaft 50, both parallel to the shaft 40 but on substantially diametrically opposite sides thereof, are rotatably journalled in bearings fixed with respect to the car structure, as at 51. The main shaft is provided with a pair of conical drums 52 secured near each end thereof for rotation therewith, and cables 53 have one end anchored to each drum at its large diameter end, as at 54 while their other ends are anchored to the channel 26' at points below the drums 52, as at 54', one of the cables being provided with a turnbuckle 112, as in the case of the upper berth.

A sprocket 55 is fixed on the secondary shaft 50 and another sprocket 56 is freely rotatably journalled on the main shaft 49, in line with the sprocket 55. The sprockets 55 and 56 are connected by a chain 57, which passes over an idler sprocket 58 freely rotatably journalled on the upper berth shaft 40, in line with the sprockets 55 and 56. A torsion spring 59 wound around the secondary shaft 50 has one of its ends secured to the fixed structure of the car, as at 60, while its other end is fixed to the shaft, preferably by securing it to the sprocket 55, as at 61. Another torsion spring 62 wound around the main shaft 49 has one of its ends affixed to the main shaft, preferably by securing it to one of the drums, as at 63, while its other end is secured to the rotatable sprocket 56, as at 64. It will be seen that by virtue of the described arrangement the torsion springs 59 and 62 are effectively placed in series with one another so as to provide the effect of a single spring having a length equal to their combined lengths and thus able to absorb the necessarily large number of turns imposed upon the drums 52 in consequence to movement of the lower berth between its operative and inoperative locations.

However, since the amount of torsion exerted by any spring increases in proportion to the number of turns through which it is wound, while the weight of the lower bunk remains constant, the drums 52 are made conical so that the cables 53 may exert a greater mechanical advantage on the shaft as the springs 59 and 62 become more tightly wound; and it will be seen that in consequence a substantially constant tension will be exerted upon the lower berth at all stages of its travel between its upper and lower locations.

Inasmuch as each berth is substantially counterbalanced by the spring and cable arrangements above described, it must be provided with lock means to securely retain it as the desired location. The lock itself for each berth comprises a pair of rods 30 axially slidable in opposite directions and situated behind the channel 26, in the ridge 28. Each rod is adapted to enter a hole (not shown) in the bulkhead aligned with the rod at each of the berth locations. Each of the rods is supported for axial sliding motion by a bearing 65 in one end plate, perpendicular to the surface of the end plate, and a second bearing in a block 66, secured to the channel 26.

A compression spring 67 coaxial with the rod reacts between the bearing block 65 and a collar 68 secured to the rod to yieldingly urge the rod axially outwardly into its mating holes in the bulkhead wall. It will be seen that the collar 68, by abutting the inner surface of the end plate, limits outward movement of the rod due to the spring 67 to the extent required to effect secure locking action.

The two locking rods for each bed member are made to move in opposite directions simultaneously by means of a lever 69 pivoted at its center on a stud 70 fixed to the channel 26 and to each end of which one of the lock rods is pivotally connected, as at 71.

Each rod 30 is actuated by means of a cable 29 one end of which is secured at the inner end of the rod, as at 72, the other end of the cable being secured, as at 73, to a lock shaft 74. The lock shaft is rotatably journalled in a rear bearing block 75 and a front bearing block 76, both secured to the outer surface of the end plate, and axial displacement of the lock shaft is prevented by a pin 81 secured to the end plate, engaged in an annular groove 82 in the lock shaft. The front end of each lock shaft is preferably provided with a head 77 of suitable shape to be operatively engaged by the mating socket of a key 78 (see Fig. 11) intended to be kept in the custody of the porter.

It will be noted that the lock shaft on one end plate 17 of each pair (see Fig. 8) is disposed with its head 74 accessible at the top of the end plate through a hole 79 in the upper portion of the end plate rim 17', while the lock shaft on the other end plate of the pair (see Fig. 9) has its head accessible through a similar hole in the bottom portion of the rim 17'. In this way the first named lock shaft is readily operable when the berth is in its operative location, while the other is easily accessible with the berth in its inoperative location.

Rotation of either of the lock shafts causes the cable 29 attached thereto to be wound around the body of the shaft, thus causing the cable to pull the rod 30 to which it is attached inwardly out of engagement with its mating hole in the bulkhead. Operation of one rod 30 in this manner will of course effect simultaneous unlocking operation of the other rod by virtue of the lever 69 interconnecting the rods.

While the arrangement just described is preferable since it assures that only the porter will have control over the position of all berths in a car, it will be seen that it may be readily modified to enable individual passengers to control the position of each berth by means of push buttons or the like, to thus adapt the berth of this invention to use for small boats, house trailers, etc.

To assist the lock in carrying the weight of the upper berth plus its occupant when the berth is in use a stop block 83 (see Fig. 5) is secured to each rail 21 in a position to engage the lower edge of the end plates 17 supporting the upper berth when the carriage is in its operative location. However, the lower berth when in use rests upon the rear surfaces 84 of the folded down seat backs 4, and since these then rest upon the surfaces of the seats 3, the lower berth needs no additional support in its position of use.

Figure 13:
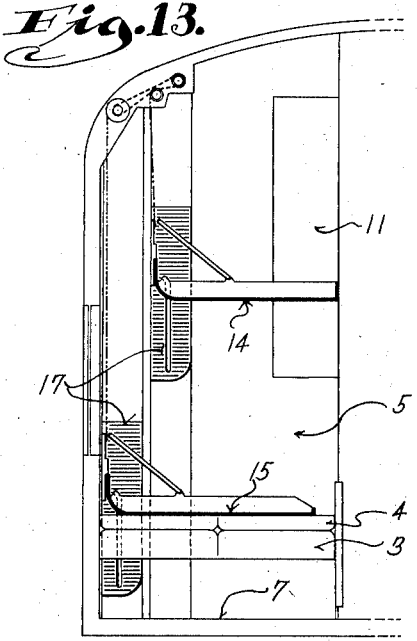
Figure 14:
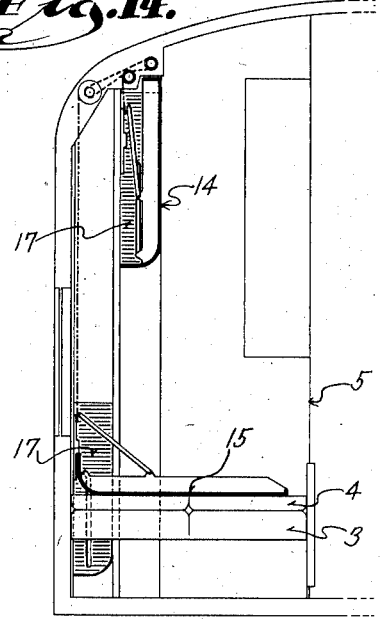
Figure 15:
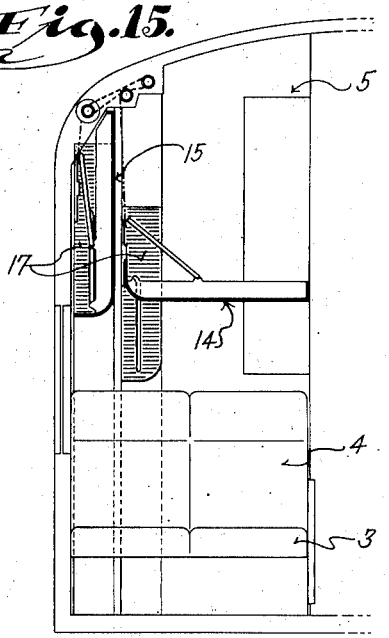

As may be seen by reference to Figures 12 to 15, the stored away berths are arranged with the lower berth 15 immediately adjacent to the side wall 6 of the car, with the upper berth 14 inwardly of the lower berth, so that the upper berth may be lowered to its position of use without interference from the lower. Thus either berth may be lowered independently of the other, or both may be lowered for nighttime occupation, or both may be raised out of the way for daytime travel. It will also be noted in Figure 15, that normal seating arrangements in the section are not disrupted when only the upper berth is in position of use, the headroom of the section merely being decreased thereby.

From the foregoing description, together with the accompanying drawings, it will be readily apparent that this invention provides upper and lower folding berths particularly adapted for use with a pair of face-to-face seats, as in the standard railroad sleeping car section, and that these berths may be made up before being folded away; that either berth may be lowered independently of the other; and that the invention provides a sleeping car section of unusual versatility. In addition to effecting great savings in makedown time, the berths of this invention also make for unusually attractive interior design in a railroad car embodying them, and provide greater headroom in the section than former sleeping car berths.

What I claim as my invention is:

1. A folding berth for railroad cars and the like, comprising: a pan-like bed member; a carriage including a pair of end plates from which the bed member is adapted to be pivotally mounted, disposed adjacent to each end of the bed member and parallel to one another, and means holding said end plates in alignment with one another and with said bed member; a pair of vertical rails in guiding engagement with each of said end plates, enabling said carriage to travel vertically between defined limits, said pairs of rails being spaced apart a distance substantially equal to the length of the bed member; means mounting the bed member at its ends to said end plates, said means enabling said bed member to be swung from an operative horizontal position to an inoperative vertical position and allowing it to travel vertically with said carriage between said defined limits when in its inoperative position; means counteracting a substantial portion of the weight of said bed member and carriage to enable the same to be pushed upwardly with slight effort; and means for readily detachably locking said carriage at each of said defined limits.

2. A convertible railroad sleeping car berth of the type which may be made into a bed having its rear edge adjacent to a fixed wall of the car and its ends adjacent to other fixed walls spaced from one another and extending inwardly at right angles from said first named wall, said berth comprising: a pan-like bed member; a substantially U-shaped carriage for the bed member, the base and legs of the U being adjacent to said first named wall and said spaced apart walls, respectively; means securing the bed member to a carriage and tiltably mounting the bed member thereon to be swung to a horizontal operative position or to a vertical inoperative position; cooperating means on said carriage and the fixed structure of the car guidingly constraining said carriage to move vertically along a defined path between defined limits when its associated bed member is folded to the inoperative position; cooperating means on the carriage and on the fixed structure of the car for releasably securing said carriage in an upper position in said defined path in which its associated bed member is flatwise adjacent to said first named wall of the car and out of the way of normal daytime occupation of the car; and cooperating means on the carriage and on the fixed structure of the car to releasably hold the carriage in a lower position along said defined path in which its associated bed member is adapted to be unfolded to operative position.

3. The sleeping car section of claim 2 further characterized by means for counteracting a substantial portion of the weight of the bed member and its associated carriage to facilitate vertical movement of the same between its defined limits.

4. In a converible section for a railway sleeping car, said section having a side wall and end walls extending at right angles to said side wall, all of said walls being rigidly secured in the car: a pan-like bed member; means on said end walls of the section mounting the bed member for movement from an inoperative position in which it is disposed vertically on edge to an operative position in which it is horizontaly disposed, said mounting means including cooperating guide and pivot means on the bed member and the end walls of the section by which the bed member can be swung from its vertical inoperative position to its horizontal operative position and be guided for bodily up and down motion from an inoperative level near the top of the section to an operative level spaced beneath the inoperative level, said mounting means being spaced from the side wall of the section a distance slightly greater than the thickness of the bed member in its inoperative position, whereby said bed member in its inoperative position is spaced from and parallel to said side wall to accommodate another similar bed member similarly mounted when the latter is in its inoperative position; and means for releasably locking said first-named bed member in its operative position and in its inoporative position.

5. In a convertible section for a railway sleeping car, said section having a side wall and end walls extending at right angles to said side wall, all of said walls being rigidly secured in the car: a U-shaped carriage; cooperating means on said end walls of the section and the legs of the U-shaped carriage mounting the carriage with the base of the U adjacent and parallel to the fixed side wall of the section and each of its legs adjacent to one of the end walls of the section, said cooperating mounting means guiding the carriage for up and down movement along a defined path; cooperating means fixed with respect to said section walls and the carriage for holding the carriage either at an upper inoperative level or a lower operative level; a pan-like bed member; and mounting means tiltably supporting the pan-like bed member on the carriage for swinging movement between a horizontal operative position and a vertical inoperative position, said mounting means for the bed member being spaced from the fixed side wall of the section and at all times holding the bed member spaced from said side wall a distance slightly greater than the thickness of the bed member so as to accommodate another similar bed member similarly mounted.

6. In a sleeping compartment for a vehicle: a fixed compartment wall; a pan-like bed member; carriage means movable up and down; means tiltably mounting said bed member on said carriage means for bodily up and down movement therewith and for swinging movement from a horizontal operative position to an inoperative position in which the bed member is disposed vertically on edge; and guide means for said carriage means constraining the same to move up and down along a defined path adjacent to said wall between defined limits at the lower of which the bed member will have one of its edges closely adjacent to said wall when in its operative position and in the upper of which the bed member, in its inoperative position, will flatwise overlie said wall, closely adjacent thereto, to thus enable bed clothing for the bed member to be clamped between the bed member and the wall.

7. A folding berth for a convertible section for railroad sleeping cars and the like, comprising: a pan-like bed member; a carriage adapted to be moved up and down; means mounting the bed member on the carriage for bodily up and down motion therewith and for tilting movement to a horizontal operative position and to an inoperative position in which the bed member is disposed vertically on edge; guide means constraining the carriage to move up and down between defined limits in the lower of which the bed member is adapted to be tilted to its operative position and in the upper of which the bed member is adapted to be held in its inoperative position out of the way of normal daytime occupation of the section; and means for counteracting a substantial portion of the combined weight of said carriage and bed member comprising a conical pulley rotatably mounted on an axis fixed with respect to the section, a torsion spring connected with the pulley to bias the same for rotation in one direction, and a cable having one of its ends connected with the carriage and its other end connected with the large end of the pulley, said cable being adapted to wrap itself around the pulley, from the large end thereof, as the pulley rotates in said direction in response to the bias thereon, during upward movement of the carriage to thus maintain a substantially constant upward force on the carriage.

CLIFFORD BROOKS STEVENS.

References Cited in the file of this patent

UNITED STATES PATENTS

| Number | Name | Date |
|---|---|---|
| 297,256 | Hale | Apr. 22, 1884 |
| 314,032 | Laskey | Mar. 17, 1885 |
| 561,654 | Cole | June 9, 1896 |
| 967,137 | Leigh | Aug. 9, 1910 |
| 1,029,167 | Brainerd | June 11, 1912 |

FOREIGN PATENTS

| Number | Country | Date |
|---|---|---|
| 851,926 | France | Oct. 16, 1939 |